United States Patent
Naccache et al.

(10) Patent No.: US 10,146,966 B2
(45) Date of Patent: Dec. 4, 2018

(54) DEVICE FOR PROCESSING DATA FROM A CONTACTLESS SMART CARD, METHOD AND CORRESPONDING COMPUTER PROGRAM

(71) Applicant: INGENICO GROUP, Paris (FR)

(72) Inventors: David Naccache, Paris (FR); Nora Dabbous, Suresnes (FR)

(73) Assignee: INGENICO GROUP, Paris (FR)

( * ) Notice: Subject to any disclaimer, the term of this patent is extended or adjusted under 35 U.S.C. 154(b) by 42 days.

(21) Appl. No.: 15/304,365

(22) PCT Filed: Apr. 10, 2015

(86) PCT No.: PCT/EP2015/057844
§ 371 (c)(1),
(2) Date: Oct. 14, 2016

(87) PCT Pub. No.: WO2015/158621
PCT Pub. Date: Oct. 22, 2015

(65) Prior Publication Data
US 2017/0039401 A1    Feb. 9, 2017

(30) Foreign Application Priority Data
Apr. 18, 2014  (FR) ..................... 14 53571

(51) Int. Cl.
*G06Q 20/34* (2012.01)
*G06K 7/08* (2006.01)
(Continued)

(52) U.S. Cl.
CPC ............. *G06K 7/08* (2013.01); *G06Q 20/352* (2013.01); *G06Q 20/40* (2013.01); *G07F 7/1025* (2013.01)

(58) Field of Classification Search
CPC ..... G06Q 20/34–20/389; G06Q 20/40–20/425
See application file for complete search history.

(56) References Cited

U.S. PATENT DOCUMENTS

| 8,151,335 B2 * | 4/2012 | Wankmueller ......... G06Q 20/04 |
| | | 370/254 |
| 2007/0055630 A1 * | 3/2007 | Gauthier ............... G06Q 20/24 |
| | | 705/44 |

(Continued)

FOREIGN PATENT DOCUMENTS

| CN | 203165098 U | 8/2013 |
| WO | 2009038446 A1 | 3/2009 |

OTHER PUBLICATIONS

English abstract of CN 203165098 retrieved from Espacenet dated Oct. 11, 2016.
(Continued)

*Primary Examiner* — Christie I Marshall
(74) *Attorney, Agent, or Firm* — BCF LLP

(57) ABSTRACT

Processing devices, methods and non-transitory computer-readable media for processing data are disclosed. The data comes from a contactless memory card. The device has at least one contactless memory card reader. Such a device also has: a keyboard for acquiring input data coming from an input peripheral; a processor for processing at least one sequence of a remote transaction initialized on the basis of data coming from a contactless card; and a switch or a cell for selecting a mode of operation that has at least two states. The at least two states are: a state, called an inactivation state, in which the processor and the at least one memory card reader are inactive; and a state, called an activation state, in which the processor is active and in which the input data entered through the input peripheral are controlled by the processor.

10 Claims, 2 Drawing Sheets

(51) Int. Cl.
*G07F 7/10* (2006.01)
*G06Q 20/40* (2012.01)

(56) References Cited

U.S. PATENT DOCUMENTS

| | | | | |
|---|---|---|---|---|
| 2011/0047036 A1* | 2/2011 | Foran-Owens | ...... | G06Q 20/204 |
| | | | | 705/17 |
| 2011/0208658 A1* | 8/2011 | Makhotin | ............... | G06F 21/34 |
| | | | | 705/75 |
| 2015/0178724 A1* | 6/2015 | Ngo | ...................... | H04L 9/0869 |
| | | | | 705/71 |
| 2015/0199673 A1* | 7/2015 | Savolainen | ........ | G06Q 20/3226 |
| | | | | 705/71 |
| 2016/0078434 A1* | 3/2016 | Huxham | ............... | G07F 19/204 |
| | | | | 705/71 |

OTHER PUBLICATIONS

International Search Report from PCT/EP2015/057844, Dedek, Frédéric, dated May 4, 2015.

\* cited by examiner

DEVICE FOR PROCESSING DATA FROM A CONTACTLESS SMART CARD, METHOD AND CORRESPONDING COMPUTER PROGRAM

CROSS-REFERENCE

This United States National Stage Patent Application of International Patent Application PCT/EP2015/057844 filed on Apr. 10, 2015 claims priority from French Patent Application Serial No. 14 53571 filed on Apr. 18, 2014, the entire content of which are incorporated herein by reference.

FIELD OF THE INVENTION

The field of the invention is that of contactless data processing and especially terminals that can read contactless cards in order to carry out secured transactional operations

PRIOR ART

At present, there are communications terminals, for example computers or tablets, having means for reading contactless cards. For terminals that are not provided with such reading means, there are external modules (for example USB-NFC sticks) which, once connected to the terminal, make up for this lack and enable the performance of operations for reading contactless cards.

A common application of contactless card reading is that of making a secured transaction, for example a payment operation. A classic sequence of contactless payment implemented through a payment terminal runs as follows:

the user presents his compatible memory card against the contactless reader integrated into the payment terminal, or against an external contactless reader connected to the payment terminal;

the software program embedded in the payment terminal carries out the steps needed to make the transaction. These steps include for example, a request for entering the user's personal identification code, a code associated with his contactless card (for example his pin code);

if necessary, the user enters his personal identification code and the transaction can be finalized (by the computation of a transaction certificate resulting from a dialog between the payment terminal and the contactless card).

Various means can be implemented to enable the entry of this code when it has to be entered into the payment terminal (which generally comprises numerous complementary securing devices). By contrast, where it is sought to implement contactless payment through a classic communications terminal (of the tablet or computer type for example), the solutions are limited. A first simple solution enables the user to enter his confidential code on the keyboard or keypad (of the computer or tablet). From the viewpoint of the securing of data, this solution has drawbacks because the data entered on the keyboard or keypad can be recorded by key-logger type software. A key-logger is a piece of spyware often used for malicious purposes. It is generally installed in a terminal without its user's knowledge, for example, when an apparently innocuous attachment attached to an email received by the user is opened. Once in place, this software is used to intercept the sequence of keys typed on the keyboard by the user and transmit this information to a third party without his being aware of it. The encryption devices that might be in place to protect the confidential information entered are inefficient inasmuch as the key logger collects information at source.

To take preventive steps against this security flaw introduced by key loggers, there is an alternative solution in which the user is asked to key in his confidential code on a visual keypad displayed on the screen, using a mouse or any other pointing device. The position of this visual keypad as well as the disposition of the keys that form it are generally generated randomly at each use, in order to prevent a malicious device of the type that captures the position of the mouse from enabling an attacker to determine the confidential code entered. This approach however is not completely reliable inasmuch as there is another category of snooper software capable of regularly transmitting copies of the user's terminal screen without his knowledge.

Since these means for entering code (physical keyboard or keypad, virtual keyboard or keypad) are managed by the operating system of the terminal, they are by their very nature exposed to potential attacks aimed at intercepting confidential data through malicious programs installed without the user's knowledge or by the exploitation of security flaws existing in installed software. Now, to carry out an entirely secured payment transaction on a communications terminal using a contactless card, it is absolutely indispensable to ensure the integrity of the transaction and therefore to ensure that there is no possibility of theft of the data entered by the user. There is therefore a need to propose a solution for obtaining better securing of transactions, especially during the entry of confidential data by a user in the context of the use of a contactless memory card.

SUMMARY OF THE INVENTION

It is an object of the invention to provide a device enabling the reading of contactless cards, for example, in the context of a payment operation, while at the same time isolating the steps for acquiring and rendering information inherent in such a transaction so as to make it inaccessible to the operating system of the terminal, so that a malicious program present in the terminal cannot access confidential information entered by the user during his payment operation.

According to the invention, such a device for reading contactless cards comprises:

means for acquiring input data coming from an input peripheral;

means for processing at least one sequence of a transaction initialized on the basis of data coming from a contactless card;

means for selecting a mode of operation comprising at least two states;

a state, called an inactivation state, in which said processing means and said at least one memory card reader are inactive;

a state, called an activation state, in which said processing means are active and in which the input data entered through said input peripheral are controlled by said processing means.

Thus, when data has to be exchanged during the performance of a transaction, the processing means are capable of preventing data entered on the input peripheral from being intercepted by a malicious software module. Indeed, in the state of activation of the device, the acquisition and processing of the data entered will be done directly by the device. Since these operations are executed outside the perimeter of action of the operating system, they cannot be the object of manipulation or alteration by malicious programs potentially present in the terminal.

According to one particular characteristic, said device comprises means for rendering output data coming from said processing means.

Thus, when data has to be exchanged during the performance of a transaction, the processing means are capable of preventing the rendered data intended for an output peripheral from being intercepted, manipulated or impaired by a malicious software module. Indeed, in the state of activation of the device, the rendered data will be visible only to the sole user who has physical access to said output peripheral.

According to one particular embodiment, said means for selecting the mode of operation take the form of a switch.

Thus, the user has the possibility of immediately visualizing the mode of operation in which the device is situated and of simply selecting another mode of operation.

According to one particular characteristic, the said means for selecting the mode of operation take the form of a cell for detecting an event external to the device.

Thus, the device can be activated or deactivated without physical interaction of the user with said device. The constraints of mechanical wear and tear and of space requirement of the device can thus be diminished.

According to one particular characteristic, said processing means take the form of a processor for securing financial transactions.

Thus, the device is capable of being used to secure payment operations.

According to one particular characteristic, said means for acquiring input data coming from an input peripheral result from the preliminary implementing of a Bluetooth pairing between said device and said input peripheral.

Thus, the acquisition of input data by the device can be done without need for a wired link between said device and the input peripheral.

According to one particular characteristic, said means for acquiring data take the form of a keyboard integrated into the device.

Thus, the entry of data can be done directly within the device, thus enabling it to be used jointly with communications terminals that do not have any independent input peripheral at their disposal.

According to another aspect, the technique also relates to a method for processing data coming from a contactless memory card. Such a method comprises:

a step for receiving a piece of activation data through the securing device;

a step for the routing, by the securing device, of at least one stream of data coming from an input device of said communications terminal to a specific shunt memory space of said securing device;

a step for activating a warning mechanism for warning a user of the communications terminal, delivering a piece of information representing a start of a transaction;

a step for obtaining at least one piece of data coming from a contactless memory card;

a step for executing a transaction comprising a step for obtaining input data from said specific shunt memory space.

According to one preferred implementation, the different steps of the method according to the invention are implemented by one or more software computer programs comprising software instructions to be executed by a data processor of a relay module according to the invention and being designed to command the execution of different steps of the methods.

The invention is therefore aimed at providing a program capable of being executed by a computer or a data processor, this program comprising instructions to command the execution of the steps of a method as mentioned here above.

This program can use any programming language whatsoever and can be in the form of a source code, object code or intermediate code between source code and object code, such as in a partially compiled form or in any other desirable form whatsoever.

The proposed technique also seeks to provide an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to execute or to be used in the execution of the method in question.

According to one embodiment, the proposed technique is implemented through software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router, etc) and is capable of accessing the hardware resources of this physical entity (memories, recording media, communications buses, input/output electronic boards, user interfaces, etc).

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

The different embodiments mentioned here above can be combined with each other to implement the invention

LIST OF FIGURES

Other features and advantages shall appear more clearly from the following description of several embodiments, given by way of simple illustratory and non-exhaustive examples and from the appended drawings, of which:

FIG. 1 presents the structure of a device for reading a contactless card according to a first embodiment;

FIG. 2 presents the structure of a device for reading a contactless card according to a second embodiment;

FIG. 3 presents the structure of a device for reading a contactless card according to a third embodiment;

DESCRIPTION OF ONE EMBODIMENT OF THE TECHNIQUE

General Principle

Figure 1:
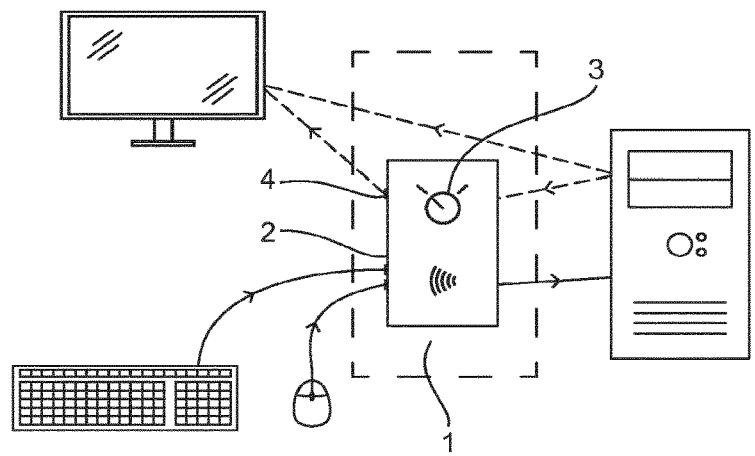

As explained here above, the proposed technique enables a securing of the payment phase from a communications terminal comprising means for reading contactless data. These pieces of data are contained in a memory card having a contactless reading interface.

The technique relates to communications terminals comprising contactless communications means and more particularly terminals capable of reading contactless cards. The proposed technique relates to a device for making certain processing operations, which are necessary for a transaction (these processing operations bring into play especially the entry of confidential information by the user), inaccessible to the operating system of the terminal. Here below, this device is called a "transaction securing device".

This is made possible by the integration into the transaction securing device of data acquisition means as well as processing means capable of processing these pieces of data without resorting to the operating system of the terminal with which this transaction securing device is used. The transaction securing device furthermore comprises selection means enabling the user to choose the desired mode of operation. These selection means can be physical means or software means.

In a first mode of operation, called an inactivation state, the contactless memory card reader is de-activated. In this state, the pieces of data coming from the input peripherals are not controlled by the transaction securing device which transmits them without modification for processing by the terminal. The pieces of data entered are therefore managed at the operating system of the terminal, in the same way as would be the case if said transaction securing device were not present.

In a second mode of operation, called an activation state, the memory card reader is activated. The presentation of a contactless memory card in proximity to the contactless reader is required in the context of the performance of a transaction. In this state, the pieces of data coming from at least one input peripheral are intercepted by the transaction securing device and are not transmitted to the operating system of the communications terminal. The processing means integrated into said transaction securing device are then implemented to control any piece of incoming data from the input peripheral controlled.

Thus, the securing of the transaction is increased, since the exchange of data between the user and the processing means integrated into the transaction securing device can no longer be intercepted by malicious software modules installed without the user's knowledge and having access to the operating system of his terminal.

Here below, three embodiments are presented of such a transaction securing device according to the proposed technique. It is clear however that the proposed technique is not limited to these particular embodiments but can also be implemented in many other embodiments and more generally in every case where the advantages provided by the proposed techniques are worthwhile.

Description of Embodiments

One of the possible applications of the present technique relates to remote bank transactions and especially to the securing of the entry of the personal identification code required for the validation of the transaction by the user, after the use of a contactless payment means such as contactless payment bank card or a portable telephone provided with contactless payment technology.

When a user wishes to carry out a remote transaction with a bank card, for example via the Internet on a merchant's site, the site requests information for identifying the bank card. This information is requested in a secured way so that it cannot be used by a malicious person. This security is especially provided by the secured payment systems via secured connections, under the control of bank institutions.

Classically, the information required must be entered by the user and is the information that appears on the credit card in question, namely the 16-digit bank identification number, the date of expiry of the card and an additional security number called a cryptogram, which can generally be seen on the back of the card.

The entry of this information is a painstaking process given the length of the identification number. Thus, contactless payment solutions for making remote transactions are being developed and promoted.

Contactless payment is already used for classic physical transactions with merchants equipped with compatible electronic payment terminals. To carry out his purchase, the customer simply places his contactless memory card on the payment terminal and the transaction is made without any action being required on his part for relatively small amounts. For greater amounts, the entry of a personal identification code is still required.

Applied to remote payment, for example, via the internet, contactless payment simplifies the transaction by avoiding the need for the user to enter bank identification numbers, date of expiry and the cryptogram of his memory card. The payment operation can thus be done more speedily and the risk of entry error is minimized. To increase the security of the transactions, the user may be asked to enter a personal identification code in addition to placing his contactless memory card on the contactless reader of his terminal.

Any data input device managed by the operating system of the terminal nevertheless has a risk of interception as explained here above.

The present technique relates to a transaction securing device comprising a contactless card reading module enabling a user to carry out a remote payment without contact while ensuring the securing of the information entered by the user and rendered to the user in making this information inaccessible to the operating system of the terminal and therefore inaccessible to malicious software potentially present in this terminal.

According to a first embodiment, illustrated in FIG. 1, the transaction securing device (1) is used jointly with a desktop computer type communications terminal consisting of a central processing unit, a screen and a keyboard type input peripheral or mouse. The transaction securing device (1) is connected to the central processing unit for example via an interface, for example of the USB (Universal Serial Bus) type. The transaction securing device (1) comprises input data acquisition means (2) for example USB or PS/2 (Personal System/2) ports to which there are connected keyboard or mouse type input peripherals. The transaction securing device (1) also comprises a selection means (3) for example a button or a switch, enabling the selection of its mode of operation.

According to one variant, this selection means (3) are not physically accessible to the user on the transaction securing device (1) but can be constituted by a detection cell internal to the transaction securing device (1), this cell being capable of detecting an external event of switching from one state to another, for example the entry of a particular combination of keys on an input peripheral, or the reception of a request for activating a payment transaction (coming from a payment service provider for example).

In a first mode of operation, called an inactivation state, the contactless memory card reader of the transaction securing device (1) is deactivated. In this state, the pieces of data coming from the input peripherals are not controlled by the transaction securing device (1) which transmits them without modification to the central processing unit and therefore to the operating system of the terminal. The data entered is therefore managed at the level of the operating system of the terminal, just as if the transaction securing device (1) were not present.

In a second mode of operation, called an activation state, the memory card reader of the transaction securing device (1) is active. The presentation of a contactless memory card in proximity to the contactless reader is required to carry out a transaction. In this state, the pieces of data coming from the input peripherals are intercepted by the transaction securing device (1) and are not transmitted to the operating system of the communications terminal. The processing means (not shown) integrated into the transaction securing device (1) are then implemented to control any incoming data from the input peripherals, such as the entry of a personal identification code for example. In this second mode of operation, the data entered will not be transmitted to the operating system. The data entered is used only to carry out a transaction.

According to one variant, the transaction securing device (1) furthermore comprises a means for rendering output data (4) for example, VGA (Video Graphics Array) connectors or HDMI (High Definition Multimedia Interface) ports or a USB port to which there are connected output peripherals, a screen for example. In the activation state of the transaction securing device (1), the processing means (not shown) integrated within said device are then implemented to generate any output data intended for the output peripheral, such as the display of a visual keypad for example, which will then be visible only to the user of the terminal inasmuch as this display is not managed by the operating system or the terminal and therefore escapes any attempt of interception by a malicious software program.

Figure 2:
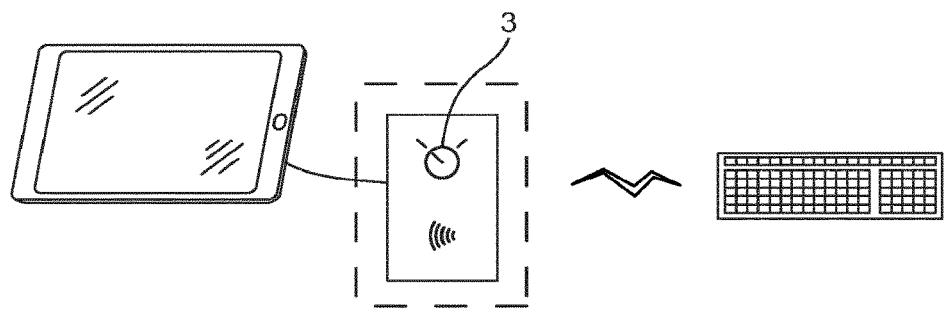

According to a second embodiment illustrated in FIG. 2, the transaction securing device (1) is used jointly with a mobile communications terminal of the tablet or portable telephone type.

The transaction securing device (1) is connected to this terminal for example through a USB cable.

The transaction securing device (1) comprises, as in the case of the previous embodiment, means (2) for acquiring input data coming from an input peripheral, means (not shown) for processing at least one sequence of a transaction initialized on the basis of data coming from a contactless card, means (3) for selecting a mode of operation comprising at least two states.

However, the means (2) for acquiring input data are implemented this time via wireless communications technology—for example Bluetooth technology. According to this second embodiment, it can be planned that the transaction securing device (1) will be capable of being paired in Bluetooth mode with input peripherals in a preliminary phase for initializing said device. According to one variant, the input data acquisition means (2) are integrated with the transaction securing device (1). In this variant, the transaction securing device (1) comprises a pinpad type of keypad.

Figure 3:
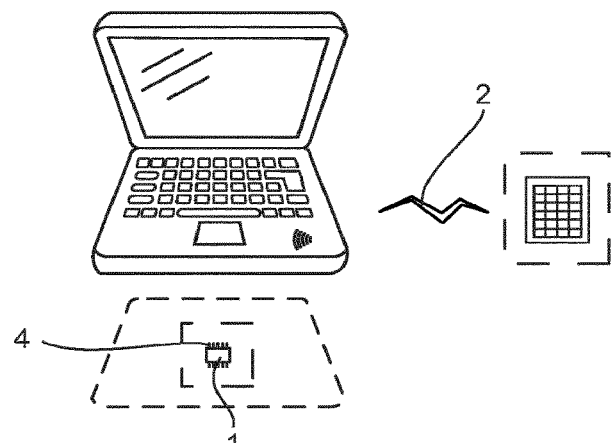
Figure 4:
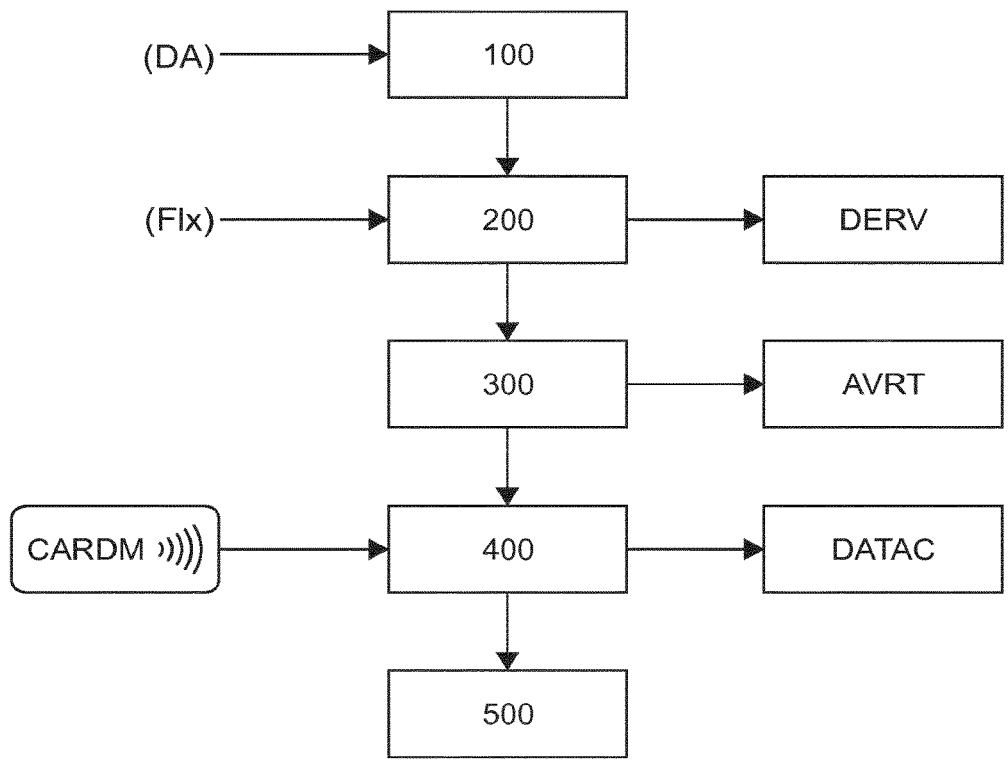
FIG. 4 illustrates the main steps of the method for reading a contactless card as implemented by the described device.

According to a third embodiment illustrated in FIG. 3, the transaction securing device (1) is entirely or partly integrated into the communications terminal (integrated into a mother board of a personal computer or a mother board of a tablet or a Smart telephone for example).

The transaction securing device (1), as in the previous embodiment, comprises means (2) for acquiring input data coming from an input peripheral, processing means (not shown) for processing at least one sequence of a transaction with data coming from a contactless card, means (3) for selecting a mode of operation comprising at least two states.

In this embodiment, the acquisition means (2) can take the form of an autonomous keypad external to the communications terminal while the processing means (not shown) are integrated into the communications terminal in the form of a dedicated secure processor and a dedicated memory space for example. In the mode of activation of the transaction securing device (1), it is this processor that succeeds the operating system in its task of intercepting and controlling incoming data transmitted by the autonomous keypad and of rendering output data on the display of the communications terminal.

According to a fourth embodiment, the transaction securing device (1) is integrated into the communications terminal (integrated into a mother board of a personal computer or a mother board of a tablet for example). This integration is furthermore expressed by the implementation of at least one complementary securing processor (CSP) which too is integrated with the communications terminal. Such a processor can for example, be an IPT (Identity Protection Technology™ processor by Intel™). In this particular embodiment, the transaction securing device (1) comprises a command interface, for the control, through particular commands, of the complementary securing processor. In this embodiment, it is the complementary securing processor that is in charge of intercepting data entered by the user and of displaying secured data on the display device. In this embodiment, the complementary securing processor (CSP) also has available a technology for managing inputs/outputs by encryption. Upon reception of the command coming from the transaction securing device, the complementary securing processor (CSP) displays a secured input window enabling the user to enter data through mouse clicks instead of strokes on the keypad. When the user has entered the required information, the complementary securing processor (CSP) transmits the result of this entry in encrypted form to the transaction securing device. The transaction securing device decrypts the information transmitted through its private key to verify the validity of the entry made by the user.

Whatever the embodiment, the technique requires an execution of the transaction within the securing device. This device is in charge of building the transaction and especially in charge of the creation of a point-to-point tunnel with a remote transactional server belonging to a payment services provider.

In this respect, the securing device therefore comprises, within a secured dedicated memory, cryptographic equipment used to create the secured tunnel with the server. The cryptographic equipment can be inserted into the securing device at the time of its manufacture. The cryptographic equipment can also be inserted during a subsequent initializing phase.

Method of Implementation

Here below, a description is provided of a method for implementing the technique described to execute a payment transaction through a contactless memory card. The method starts after the device has received, from the communications terminal or from a merchant server with which the communications terminal is connected, a transaction amount (when it is a payment transaction) and a transaction beneficiary (for example an account or a bank identifier).

Such a method comprises:

a step (100) for the reception, by the securing device, of a piece of activation data (DA); this piece of activation data can be received through a request from a server of a payment services provider, or through a switch on the securing device itself or again through a combination of key strokes made on the keypad;

a routing step (200) for the routing by the securing device of at least one data stream (FLX) coming from an input device of said communications terminal, to a specific shunt memory space (DERV) of said securing device;

a step (300) of activation of a warning mechanism (AVRT) of a user of the communications device delivering a piece of information representing a transaction start; such a piece of information can for example, be presented by the activation of a light-emitting diode directly connected to a processor of the securing device or again by a display specific to the screen of the communications terminal or again by a combination of these two elements; this warning device triggers a "timer" defining a period of time during which the user can present his contactless card before the corresponding reader;

a step (400) for obtaining at least one piece of data (DATAC) coming from a contactless memory card (CARDM);

a step (500) for executing a transaction, comprising a step for obtaining input data from said specific shunt memory space and said at least one piece of input data.

Thus, the proposed method is used to carry out a secured transaction. The pieces of input data obtained from the specific shunt memory space are for example, a personal identification code that has to be entered by the user. This personal identification code is required during the execution of the transaction.

Other Characteristics and Advantages

Figure 5:
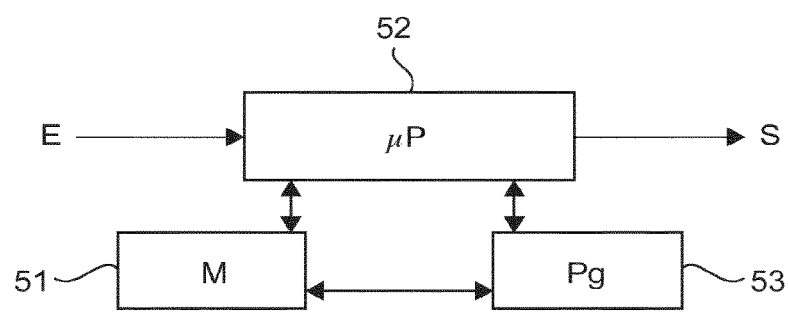
FIG. 5 illustrates a device for securing according to the proposed technique.

Referring to FIG. 5, a description is provided of a payment securing device comprising means for executing the method described here above.

For example, the payment securing device comprises a memory 51 constituted by a buffer memory, a processing unit 52, equipped for example with a microprocessor and driven by the computer program 53 applying the methods needed for implementing payment functions.

At initialization, the code instructions of the computer program 53 are for example loaded into a memory and then executed by the processor of the processing unit 52. The processing unit 52 receives at input (E) for example, activation data and/or data representing a purchase. The microprocessor of the processing unit 52 implements the steps of the method for verifying authenticity according to the instructions of the computer program 53 to carry out payments and notify the success or failure of these payments at output (S).

To this end, the securing device comprises, in addition to the buffer memory 51, means for the contactless transmission/reception of data and possibly an encryption processor and possibly communications means such as network communications modules used to set up a secured point-to-point link with a server of a payment services provider.

According to the invention, such a payment securing device furthermore comprises routing means for routing peripheral input data to a shunt memory and means for reading this shunt memory. These means can be driven by the processor of the processing unit 52 according to the computer program 53 when the securing device is activated (either by hand or electronically). Complementarily, such a payment securing device can include a specific antenna, integrated into the casing of the securing device, the antenna being designed to come into contact with a contactless reception/transmission module, for example, present in the memory card.

The invention claimed is:

1. A processing device for processing data coming from a contactless memory card, said device comprising at least one contactless memory card reader, said device being connected to or integrated at least partially into a user's personal communications terminal, said device comprising:
   means for acquiring input data coming from an input peripheral;
   processing means for processing at least one sequence of a remote transaction initialized on the basis of data coming from a contactless card;
   selection means for selecting a mode of operation comprising at least two states:
      a state, called an inactivation state, in which said processing means and said at least one memory card reader are inactive and in which pieces of input data entered through said input peripheral are transmitted to the operating system of said communications terminal; and
      a state, called an activation state, in which said processing means and said at least one memory card reader are active and in which pieces of input data entered through said input peripheral are controlled by said processing means.

2. The device according to claim 1, further comprising means for rendering output data coming from said processing means.

3. The device according to claim 1 wherein the selection means take the form of a switch that can be handled by the user.

4. The device according to claim 1 wherein the selection means take the form of a cell for detecting an event external to the device.

5. The device according to claim 1 wherein the processing means take the form of a processor for securing financial transactions.

6. The device according to claim 1 wherein the means for acquiring input data coming from an input peripheral result from the preliminary implementing of a Bluetooth pairing between said device and said input peripheral.

7. The device according to claim 1 wherein said means for acquiring data take the form of a keyboard integrated into the device.

8. A method for processing data coming from a contactless memory card, by means of a data processing device according to claim 1, said data processing device comprising at least one contactless memory card reader, said method comprising:
- receiving a piece of activation data by means of the data processing device;
- routing, by the data processing device, of at least one stream of data coming from an input device of said communications terminal, to a specific shunt memory space of said data processing device;
- activating a warning mechanism for warning a user of the communications terminal, delivering a piece of information representing a start of a transaction;
- obtaining at least one piece of data coming from a contactless memory card;
- executing a transaction comprising obtaining input data from said specific shunt memory space.

9. The method according to claim 8 wherein the pieces of input data are a personal identification code.

10. A non-transitory computer-readable medium comprising program code instructions stored thereon for executing a method for processing data coming from a contactless memory card, when the program code instructions are executed by a processor, the method comprising:
- receiving a piece of activation data by means of the data processing device;
- routing, by the data processing device, of at least one stream of data coming from an input device of said communications terminal, to a specific shunt memory space of said data processing device;
- activating a warning mechanism for warning a user of the communications terminal, delivering a piece of information representing a start of a transaction;
- obtaining at least one piece of data coming from a contactless memory card;
- executing a transaction comprising obtaining input data from said specific shunt memory space.

* * * * *